(12) United States Patent
Hu et al.

(10) Patent No.: US 11,960,199 B2
(45) Date of Patent: Apr. 16, 2024

(54) PROJECTION SCREEN

(71) Applicant: APPOTRONICS CORPORATION LIMITED, Guangdong (CN)

(72) Inventors: Fei Hu, Shenzhen (CN); Wei Sun, Shenzhen (CN); Lin Wang, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 16 days.

(21) Appl. No.: 17/597,381

(22) PCT Filed: Jun. 28, 2020

(86) PCT No.: PCT/CN2020/098452
§ 371 (c)(1),
(2) Date: Jan. 4, 2022

(87) PCT Pub. No.: WO2021/000792
PCT Pub. Date: Jan. 7, 2021

(65) Prior Publication Data
US 2022/0276551 A1    Sep. 1, 2022

(30) Foreign Application Priority Data

Jul. 4, 2019    (CN) .......................... 201910598796.8

(51) Int. Cl.
*G03B 21/60*    (2014.01)
*G03B 21/56*    (2006.01)
(Continued)

(52) U.S. Cl.
CPC ............. *G03B 21/60* (2013.01); *G03B 21/56* (2013.01); *G03B 21/58* (2013.01); *G03B 21/62* (2013.01); *G03B 21/625* (2013.01)

(58) Field of Classification Search
CPC ........ G03B 21/60; G03B 21/56; G03B 21/58; G03B 21/62; G03B 21/625
(Continued)

(56) References Cited

U.S. PATENT DOCUMENTS 4,880,292 A * 11/1989 Kageyama ........... G03B 21/625
359/457
5,096,278 A * 3/1992 Yoshioka ............. G03B 21/602
359/459
(Continued)

FOREIGN PATENT DOCUMENTS

CN     1294317       5/2001
CN     1294317 A  *  5/2001  ............. G03B 21/60
(Continued)

OTHER PUBLICATIONS

International Search Report for International Application PCT/CN2020/098452, dated Oct. 9, 2020.

*Primary Examiner* — Stephanie E Bloss
*Assistant Examiner* — Kevin C Butler
(74) *Attorney, Agent, or Firm* — Burris Law, PLLC (57) ABSTRACT

A projection screen includes an optical collimating layer and a surface diffusion layer which are arranged in sequence. A grating absorption layer for absorbing ambient light from various directions except a projection light direction is also provided between the optical collimating layer and the surface diffusion layer. The grating absorption layer includes a plurality of light-absorption ring-shaped units with different radii. The plurality of light-absorption ring-shaped units are arranged in a concentric ring. Each of the light-absorption ring-shaped units consists of a plurality of gratings arranged in the circumferential direction of the concentric ring. By taking a vertical symmetrical center line of the projection screen as a center, in a direction extending along the circumferential direction of the concentric ring to the left (Continued)

side and the right side of the projection screen, the distance between two adjacent gratings in the same light-absorption ring-shaped unit gradually increases.

11 Claims, 5 Drawing Sheets

(51) Int. Cl.
  *G03B 21/58* (2014.01)
  *G03B 21/62* (2014.01)
  *G03B 21/625* (2014.01)
(58) Field of Classification Search
  USPC .......................................................... 359/442
  See application file for complete search history.

(56) References Cited

U.S. PATENT DOCUMENTS

| | | | | |
|---|---|---|---|---|
| 6,898,008 | B1 * | 5/2005 | Sun | ........................ H04N 5/74 |
| | | | | 359/449 |
| 7,262,911 | B2 * | 8/2007 | Niwa | ..................... G03B 21/60 |
| | | | | 359/461 |
| 7,287,881 | B2 * | 10/2007 | Hibi | ....................... G03B 21/62 |
| | | | | 362/346 |
| 9,623,615 | B2 * | 4/2017 | Sasahara | .......... B29D 11/00288 |
| 11,300,869 | B2 * | 4/2022 | Wang | ..................... G03B 21/28 |
| 2007/0177263 | A1 * | 8/2007 | Ono | ..................... G03B 21/625 |
| | | | | 359/457 |
| 2009/0190211 | A1 * | 7/2009 | Kodama | .............. G03B 21/625 |
| | | | | 359/457 |
| 2018/0284593 | A1 * | 10/2018 | Li | .......................... G03B 21/62 |
| 2022/0075250 | A1 * | 3/2022 | Wang | ..................... G03B 21/56 |
| 2022/0121097 | A1 * | 4/2022 | Wang | .................. G03B 21/602 |
| 2022/0276551 | A1 * | 9/2022 | Hu | ....................... G03B 21/602 |

FOREIGN PATENT DOCUMENTS

| | | | | |
|---|---|---|---|---|
| CN | 1670618 | | 9/2005 | |
| CN | 1723699 | | 1/2006 | |
| CN | 1723699 | A * | 1/2006 | .............. H04N 5/74 |
| CN | 101430495 | | 5/2009 | |
| CN | 103605258 | | 2/2014 | |
| CN | 105408777 | | 3/2016 | |
| CN | 104516182 | | 5/2016 | |
| DE | 19700162 | A1 * | 7/1998 | .............. G02B 5/32 |
| JP | H0456837 | U * | 2/1992 | .............. E04F 11/02 |
| KR | 101125176 | | 3/2012 | |

* cited by examiner

PROJECTION SCREEN

CROSS-REFERENCE TO RELATED APPLICATIONS

This application is a national phase application of International Application No. PCT/CN2020/098452, filed on Jun. 28, 2020, which claims priority to and the benefit of CN 201910598796.8, filed on Jul. 4, 2019. The disclosures of the above applications are incorporated herein by reference.

FIELD

The present disclosure relates to a projection screen, belonging to the technical field of projection screen manufacturing.

BACKGROUND

The statements in this section merely provide background information related to the present disclosure and may not constitute prior art.

A screen is an important factor that affects a projection display system, and has a great impact on image quality of projection display. A contrast of an image reflected by the screen is much lower than a contrast of a projector due to impact of the ambient light. A common projection screen can reflect light rays from both a projector and ambient light. In order to improve the contrast of the screen in the presence of ambient light, the related art provides projection screens that resist ambient light.

SUMMARY

This section provides a general summary of the disclosure and is not a comprehensive disclosure of its full scope or all of its features.

The technical problem to be solved by the present disclosure is to provide a projection screen to solve the shortcomings of the related art. By setting gratings arranged non-uniformly in the form of concentric rings, the projection screen has characteristics of good brightness uniformity and high ambient light resistance. A grating absorption structure can effectively distinguish projection light from ambient light, so that the projection screen has a high gain, thus reducing the cost of optical engine of the projector.

The technical solution to be solved by the present disclosure is implemented by the following technical solutions.

The present disclosure provides a projection screen. The projection screen includes an optical collimation layer and a surface diffusion layer that are sequentially disposed, and a grating absorption layer configured to absorb ambient light from various directions except direction of incident projection light and disposed between the optical collimation layer and the surface diffusion layer. The grating absorption layer includes ring-shaped light-absorbing units with different radiuses, the ring-shaped light-absorbing units are arranged in the form of concentric rings, and at least two of gratings are arranged along a circumference of one of the concentric rings to form one of the ring-shaped light-absorbing units. With a vertical symmetrical center line of the projection screen as a center, in directions extending towards a left side and a right side of the projection screen along the circumference of one of the concentric rings, a distance between two adjacent gratings of the at least two gratings in one of the ring-shaped light-absorbing units increases gradually.

In conclusion, the present disclosure provides a projection screen. By setting gratings arranged non-uniformly in the form of concentric rings, the projection screen has characteristics of good brightness uniformity and high ambient light resistance. In addition, the grating absorption structure can effectively distinguish between projection light and ambient light, so that the projection screen has high gain, thus reducing the cost of optical engine of the projector.

The present disclosure will be described in detail below in conjunction with the accompanying drawings and specific embodiments.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3b is a side view of FIG. 3a;

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the

First Embodiment

Figure 1:
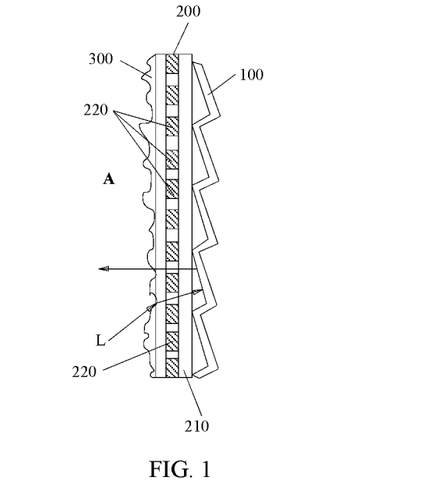
FIG. 1 is a cross-sectional view of a projection screen at its center according to a first embodiment of the present disclosure.
Figure 2:
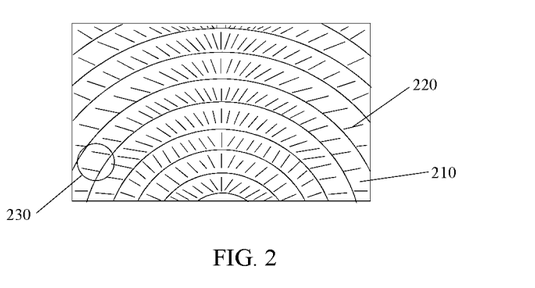
FIG. 2 is a schematic diagram of arrangement positions of gratings of a projection screen according to the first embodiment of the present disclosure.

FIG. 1 is a cross-sectional view of a projection screen at its center according to the first embodiment of the present disclosure. FIG. 2 is a schematic diagram of arrangement positions of gratings of a projection screen according to the first embodiment of the present disclosure. As shown in FIG. 1 and FIG. 2, the present disclosure provides a projection screen. With a viewer's side as an outer side A, the projection screen includes, from inside to outside, an optical collimation layer 100, a grating absorption layer 200, and a surface diffusion layer 300. In other words, the grating absorption layer 200 is disposed between the optical collimation layer 100 and the surface diffusion layer 300. The grating absorption layer 200 is configured to absorb ambient light from various directions except direction of incident projection light. The optical collimation layer 100 is configured to reflect projection light. The surface diffusion layer 300 is configured to increase a divergence angle of outgoing light.

Specifically, the grating absorption layer 200 includes multiple ring-shaped light-absorbing units with different radiuses, the ring-shaped light-absorbing units are arranged in a form of concentric rings, and each ring-shaped light-absorbing units is formed by multiple gratings 220 arranged along a circumference of one of the concentric rings. With a vertical symmetrical center line of the projection screen as a center, in directions extending towards a left side and a right side of the projection screen along the circumference of the concentric ring, a distance between two adjacent gratings 220 in a same ring-shaped light-absorbing unit is increasing gradually. In an embodiment, a distance between two adjacent gratings 220 respectively located in different ring-shaped light-absorbing units is increasing gradually along a direction away from a circle center of the concentric rings, which improves the brightness uniformity of the projection screen.

In an ultra-short focus laser TV application, a projection screen of a projector that is resistant to ambient light needs to absorb as much ambient light as possible, while reducing the absorption of light from the projector. For an ultra-short focus projector, all light emitted from the projector is diffuse light centered on the projector lens, while most of ambient light comes from the side or top surface. Due to the angle selectivity of the grating structure, projection light from a fixed direction can pass through the grating, while ambient light from other directions is effectively blocked, so that the projection screen has good resistance against ambient light. Because the grating absorption layer can effectively distinguish directional projection light from ambient light from various directions except the direction of the projection light, the projection screen has a high gain, thus reducing the cost of optical engine of the projector.

Figure 3A:
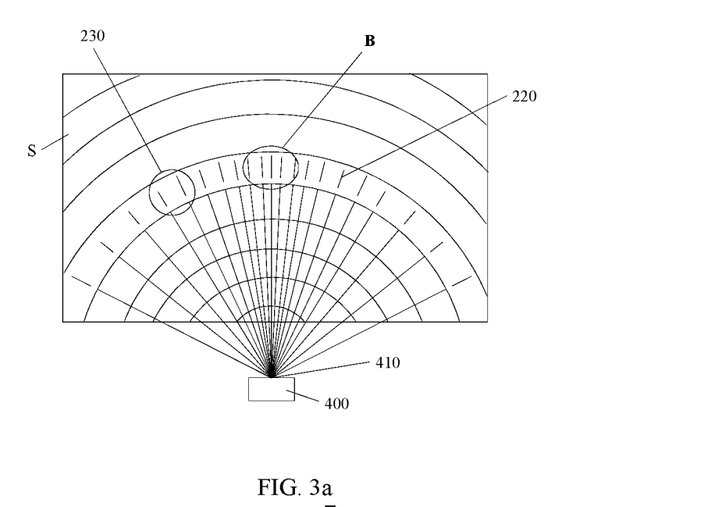
FIG. 3a is a schematic diagram of arrangement positions of a projection screen and a projector according to the first Embodiment of the present disclosure.
Figure 3B:
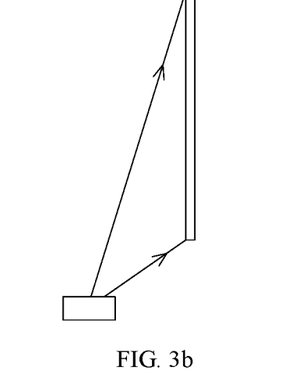
Figure 3C:
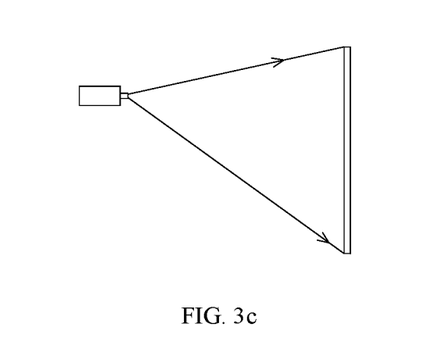
FIG. 3c is a side view of arrangement positions of a projection screen and a projector according to another embodiment of the present disclosure.

FIG. 3a is a schematic diagram of arrangement positions of a projection screen and a projector according to the first embodiment of the present disclosure. FIG. 3b is a side view of FIG. 3a. FIG. 3c is a side view of arrangement positions of a projection screen and a projector according to another embodiment of the present disclosure. As shown in FIG. 3a, the gratings 220 are arranged in the form of concentric rings, and a circle center of the concentric rings can be adjusted according to actual requirements. For example, in this embodiment, the circle center 410 is located on a vertical symmetrical center line of the projection screen, and is located below an outer side of the projection screen. The circle center 410 can also be located on the projection screen.

Specifically, as shown in FIG. 3c, when a picture is projected on the projection screen by means of short focus projection, or medium focus projection, or long focus projection, the height of the projector can coincide with the height of the picture because the picture is projected far away from the projection screen. In this case, the circle center is located on the projection screen. For example, when the center of a light-emitting surface of the projection screen (which is a plane formed by light from the projector after being reflected by the projection screen and is parallel to the plane of the projection screen) has a same height as the lens of the projector, the circle center of the concentric rings is located at the center of the light-emitting surface.

Taking an ultra-short focus projection as an example, in order to improve the contrast and reduce the impact of ambient light on the picture, as shown in FIG. 3a and FIG. 3b, the circle center 410 is located on the vertical symmetrical center line of the projection screen and is below an outer side of the projection screen. The source of the ambient light is generally the sunlight from windows on the left and right of the projection screen and light from the ceiling, etc. At this time, the height of the projector is low, and angles of the picture light and the ambient light incident on the projection screen are significantly different. The gratings in the present disclosure are designed to absorb as much light as possible from directions other than the direction of incident projection light. The projection screen of this structure has better resistance against ambient light.

As shown in FIG. 2 and FIG. 3a, an incident angle of light L from the projector 400 and an incident angle of ambient light on the projection screen S are generally different from each other. The projection screen provided by the present disclosure has ring-shaped light-absorbing units arranged in the form of concentric rings. In an embodiment, extension lines of length directions of all the gratings 220 in each concentric ring intersect at the circle center 410 of the concentric rings. As described above, all light emitted by the projector is diffused from the lens of the projector. The light decays more severely as it travels farther away from the center of the lens. As shown in FIG. 3, the distances from the top and bottom of the projection picture to the lens are different, and therefore the picture is actually non-uniform. When projection screen is used, Fresnel reflection occurs on the surface of the projection screen, which causes poor brightness uniformity on the projection screen. Such defect can be compensated by changing the density of the gratings. That is, near the symmetrical center line of the projection screen (where the projection screen has high brightness), the gratings have small spacing and are densely distributed; at the corners of the projection screen where the brightness is low, the gratings have large spacing and are sparsely distributed. Such configuration described above can solve the problem of brightness non-uniformity due to that the gratings allow projection light from a fixed direction to pass through, but at the same time inevitably absorb some of the projection light shining on the gratings. In this way, with the configuration that gratings in areas with higher brightness are arranged relatively densely and gratings in areas with lower brightness are arranged relatively sparsely, the overall uniformity of the picture can be improved. In other words, in the multiple concentric rings of the present disclosure, the positions of the gratings 220 between different rings are independent from each other, and the density of gratings in different areas of the projection screen can be freely adjusted as required, so that the brightness uniformity of the projection screen is higher.

In an embodiment, the gratings of the present disclosure are specifically processed in the following manner.

The gratings are prepared by using a black light-absorbing optical resin or a thermosetting resin. The resin is coated first, then molding is performed by using a mold, and finally curing is performed. The black light-absorbing optical resin is made of a resin that incorporates carbon black or black pigment. Specifically, the black light-absorbing optical resin or thermosetting resin is first coated on the transparent substrate 210, and then a grating mold is rolled on the substrate coated with the black light-absorbing optical resin. The grating mold can be obtained by means of precision machine tooling, and can be a flat mold or a roller mold. Finally, the molded resin is processed with UV light irradiation or thermal curing.

The gratings can be directly disposed on the transparent substrate 210 to form the grating absorption layer 200, and then the grating absorption layer 200 can be combined with the optical collimation layer 100 and the surface diffusion layer 300, or the gratings can be directly formed on a substrate of the optical collimation layer 100 or a substrate of the surface diffusion layer 300.

Second Embodiment

Figure 4:
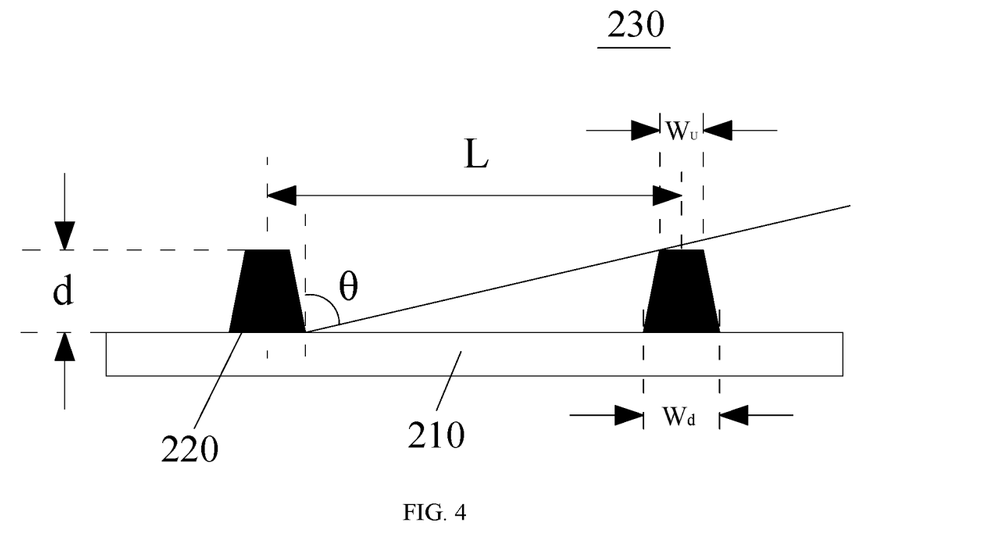
FIG. 4 is a schematic diagram of gratings according to a second embodiment of the present disclosure.

FIG. 4 is a schematic diagram of gratings according to a second embodiment of the present disclosure. As shown in FIG. 4, in the embodiment, the grating 220 on the transparent substrate 210 has a cross section in a shape of a trapezoid. Taking a trapezoidal grating as an example, the specific structure selection principle and dimensional parameters of the gratings in the present disclosure are described in detail below with reference to FIG. 4.

FIG. 4 illustrates two adjacent gratings 220 in a same concentric ring are arranged along a circumference (an arc direction), and basic parameters of a grating are given as follows.

L: a distance between two adjacent gratings (corresponding to a chord length on the concentric arc)
Wu: an upper width of the cross section of the grating
Wd: a lower width of the cross section of the grating
d: a height of the grating
θ: an angle of complete light absorption; when an angle of lateral incident light is greater than θ, the light is completely absorbed.

The parameters satisfy the following relationship:

$$\theta = tg^{-1}\left(\frac{L - \frac{W_d}{2} - \frac{W_u}{2}}{d}\right), \quad (1)$$

when Wu=Wd, the grating is cubic and has a rectangular cross section; when Wu=0, the grating is in a tri-prism structure and has a triangular cross section; and when 0<Wu<Wd, the grating has a trapezoidal frustum structure and has a trapezoidal cross section.

The value of θ represents an angular range of ambient light that can be absorbed, and the smaller θ is, the more ambient light can be absorbed. It can be seen from equation (1) that the value of θ is related to the upper or lower width Wi (i=d or u) of the grating, the height d of the grating, and the distance L between adjacent gratings.

When the width W and the height d are fixed, θ increases as the distance L between adjacent gratings increases. In this case, this area of the projection screen absorbs less ambient light, allows more projection light to pass through. Therefore, this area has a relatively high brightness; otherwise, the brightness is relatively low.

Changing the width of the grating and changing the distance between gratings achieve the same effect, which is to adjust the density of the gratings. When the width W of the grating and the distance L between gratings are fixed, θ changes accordingly when adjusting the height d of the grating, and the brightness of a certain area of the projection screen changes accordingly.

Since the gratings are arranged in the form of concentric rings, the value of L is theoretically not constant even for two adjacent gratings, that is, a distance between a head and a tail of any one grating is different from a distance between a head and a tail of another grating adjacent to the any one grating. The above difference does not greatly affect the light absorption effect of the projection screen.

It can be seen from above that in the present disclosure, the brightness uniformity and contrast of the projection screen can be adjusted by adjusting the distance between gratings and the height of the grating. Specifically, value ranges of the parameters are as follows:

The height of the grating ranges from 50 μm to 1,000 μm, for example, 50 μm to 200 μm.

The width of the grating ranges from 50 μm to 500 μm, for example, 200 μm to 300 μm.

The distance between gratings ranges from 200 μm to 2000 μm, for example, 200 μm to 500 μm.

The length of the grating ranges from 50 μm to 1665 mm, for example, 200 μm to 5000 μm.

As can be seen from the above, the projection light is incident on the projection screen in a fixed direction, while the ambient light comes from all directions and mainly from the top illumination and side window light. Therefore, according to the difference between the incident angles of the projection light and the ambient light, a projection screen structure that can differentiate between the two is provided, thus reducing the impact of the ambient light on the contrast of the projection screen. In the related art, ambient light is reduced by using a Fresnel structure and coating a reflective layer on the back. However, this method has two defects. One is that in order to eliminate as much ambient light as possible, the reflective layer has low reflectivity, which can improve the contrast of the projection screen, but results in low reflectivity of projection light, leading to low gain of the projection screen. Therefore, in order to obtain high picture brightness, it is necessary to increase the output brightness of the projector, which increases the cost of optical engine. The other defect of the method is that the structure of Fresnel with the reflective layer is mainly suitable for ultra-short throw projectors placed below the projection screen. For educational machines placed above the projection screen, the top illumination light leads to low contrast of the projection screen because this structure has difficulty in distinguishing light from the same direction. In the projection screen provided by the present disclosure, the gratings improve the contrast based on the principle of distinguishing between directional and non-directional light, and only the ambient light that is exactly in the same direction as the projector light cannot be absorbed well, while the ambient light in all other directions can be absorbed effectively. Therefore, the projection screen has high contrast, ultra-short throw projectors can be placed in a wider range. In addition, the reflectivity of the reflective coating in the present disclosure can be increased.

Assuming that the transmittance of the grating structure to the ambient light is Ta, the transmittance of the grating structure to the projection light is Ts, and the reflectivity of the reflective coating is R, the reflectivity of the projection screen to the ambient light is:

$$R_a = T_a^2 \cdot R \qquad (2).$$

The reflectivity of the projection screen to projection light is:

$$R_s = T_s^2 \cdot R \qquad (3).$$

For example, if Ta=0.5, Ts=0.7, and R=0.9, the reflectivity of the projection screen to the ambient light is 22.5%, while the reflectivity to the projection light is 44.1%. Without gratings, to achieve the same contrast effect, the reflectivity of the reflective coating is 22.5%, and the reflectivity to the projection light is also 22.5%, which is much lower than the reflectivity with the addition of gratings. Therefore, the gain of the projection screen is also low. In addition, because the gain of the projection screen is improved, a relatively bright picture can be obtained without further increasing the output brightness of the projector, thereby reducing the manufacturing cost of the optical machine. In other words, in order to achieve the same light resistance effect as the projection screen structure with gratings, the structure without gratings needs to reduce the reflectivity of the reflective coating, but this also causes a loss to the projection light.

The above-mentioned transmittance of the grating structure to the ambient light refers to overall transmittance of the grating structure to a beam, which can be interpreted as a ratio of total energy of the beam that has passed through the grating structure to total energy of the beam before incident on the grating structure. The transmittance is determined by the density of gratings and the light transmittance of the shape-memory grating material.

Third Embodiment

Figure 5:
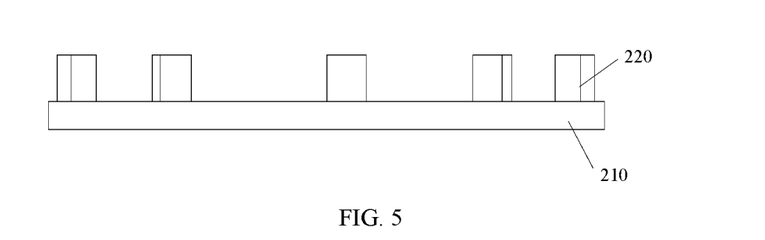
FIG. 5 is a schematic diagram of gratings according to a third embodiment of the present disclosure.

FIG. 5 is a schematic diagram of gratings according to a third embodiment of the present disclosure. As shown in FIG. 5, in an embodiment, the upper width and the lower width of the cross section of the grating are equal to each other. That is, when Wu=Wd, the grating is cubic and has a rectangular cross section.

Fourth Embodiment

Figure 6:
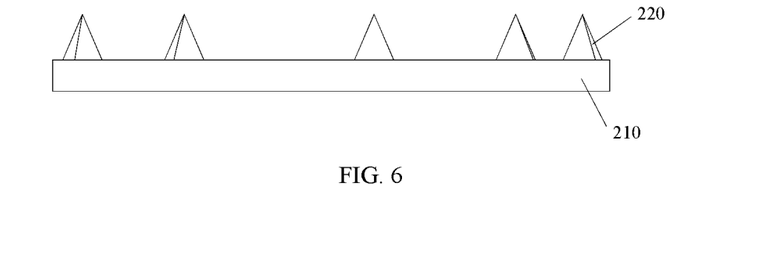
FIG. 6 is a schematic diagram of gratings according to a fourth Embodiment of the present disclosure.

FIG. 6 is a schematic diagram of gratings according to a fourth embodiment of the present disclosure. As shown in FIG. 6, in an embodiment, the upper width of the cross section of the grating is zero. That is, when Wu=0, the grating has a triangular pyramidal structure and has a triangular cross section.

Fifth Embodiment

Figure 7:
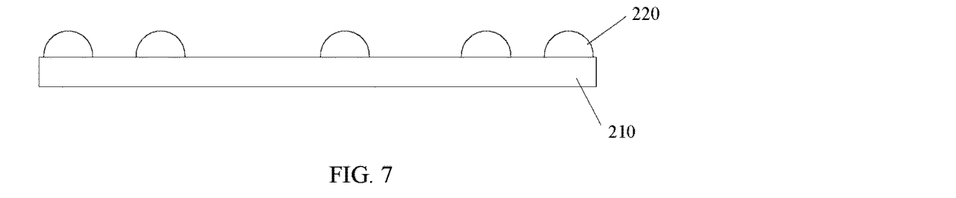
FIG. 7 is a schematic diagram of gratings according to a fifth embodiment of the present disclosure.

FIG. 7 is a schematic diagram of gratings according to a fifth embodiment of the present disclosure. As shown in FIG. 7, in an embodiment, the grating 220 is semi-spherical and has a semi-circular cross section.

It can be learned from the first embodiment to the fifth embodiment that the grating in the present disclosure can be in various structural forms, and can be triangular, rectangular, trapezoidal or semi-circular. Any grating shape that can achieve as much absorption of ambient light as possible and high transmittance of projection light falls within the protection scope of the present disclosure. Those skilled in the art can choose the grating shape according to the actual needs, and details are not described herein again. FIG. 5 to FIG. 7 are cross-sectional views of the gratings taken along a certain radius direction passing through the circle center, that is, being schematic diagrams of the gratings in the circle in the range of part B in FIG. 3. Since the gratings are arranged in the form of concentric rings, gratings in each ring have a different density, and the distance between adjacent gratings in the cross-section view also varies.

Sixth Embodiment

Figure 8:
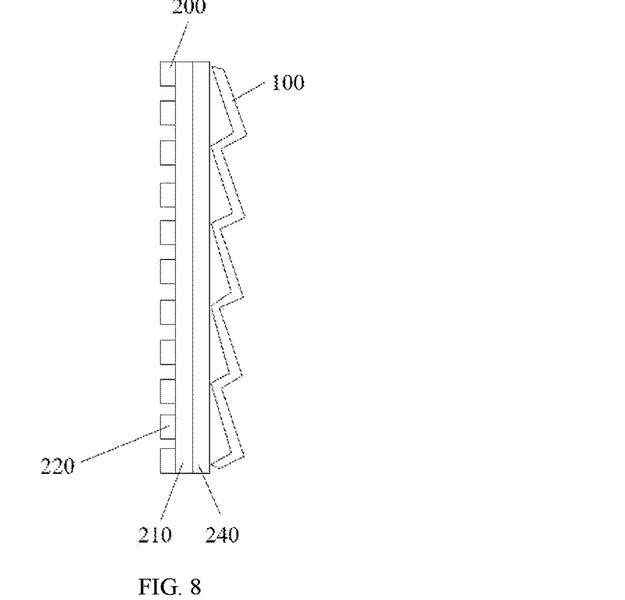
FIG. 8 is a schematic diagram of an interconnection between an optical collimation layer and a grating absorption layer according to a sixth embodiment of the present disclosure.

FIG. 8 is a schematic diagram of an interconnection between an optical collimation layer and a grating absorption layer according to a sixth embodiment of the present disclosure. As shown in FIG. 8, the optical collimation layer 100 is disposed on a side of a collimation layer substrate 240, and another side of the collimation layer substrate 240 is bonded to a side of the transparent substrate 210 facing towards the gratings 220. In other words, the gratings 220 are separately manufactured on a transparent substrate, and then bonded with other functional layers.

Seventh Embodiment

Figure 9:
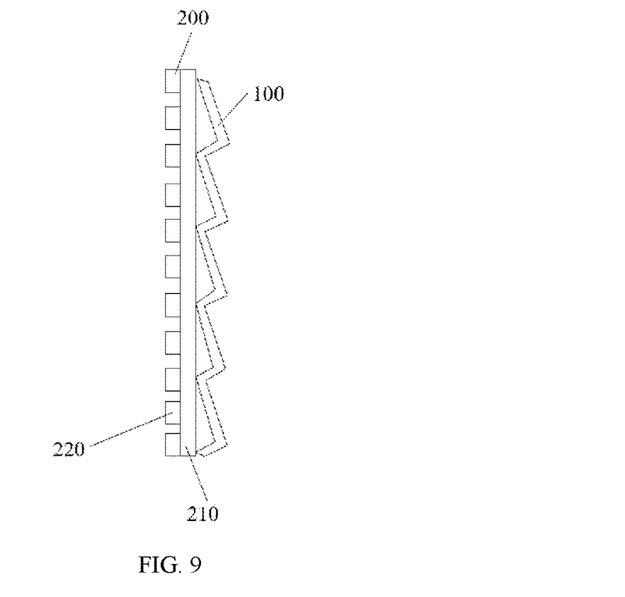
FIG. 9 is a schematic diagram of an interconnection between an optical collimation layer and a grating absorption layer according to a seventh embodiment of the present disclosure.

FIG. 9 is a schematic diagram of an interconnection between an optical collimation layer and a grating absorption layer according to a seventh embodiment of the present disclosure. As shown in FIG. 9, the optical collimation layer 100 is disposed on a side of the transparent substrate 210 facing towards the gratings 220. In other words, the gratings 220 and the optical collimation layer 100 are processed on two sides of the same substrate, respectively, thereby reducing the bonding process.

Eighth Embodiment

The presence of the gratings reduces the reflectivity of the projection screen, resulting in a decrease in the gain of the projection screen. Therefore, in this embodiment, the gratings can be prepared by using a gray translucent material. Specifically, since the absorptivity of an all-black absorbing material is about 90%, a gray translucent material with absorptivity smaller than 90% can be selected to make the gratings prevent the low gain of the projection screen. The grating structure is prepared by using the same method as that of the black absorbing material. Since the absorptivity of the gray translucent material is not close to 100%, the gain of the projection screen is increased. Besides, the projection screen is more resistant to ambient light than the projection screen without the grating structure.

In the related art, the reflectivity of the reflective coating needs to be reduced in order to improve the ambient light resistance and the contrast, which will also cause the same extent of loss of the projection light, resulting in the low gain. The structure in the present disclosure absorbs ambient light from multiple angles while ensuring that the projection light is transmitted through gaps between gratings. Although there is still certain loss of the projection light, the reflective coating can achieve a high reflectivity, such as 90%. In the end, the reflectivity for the projection light is still higher than before, and the gain is thus increased.

Ninth Embodiment

Figure 10:
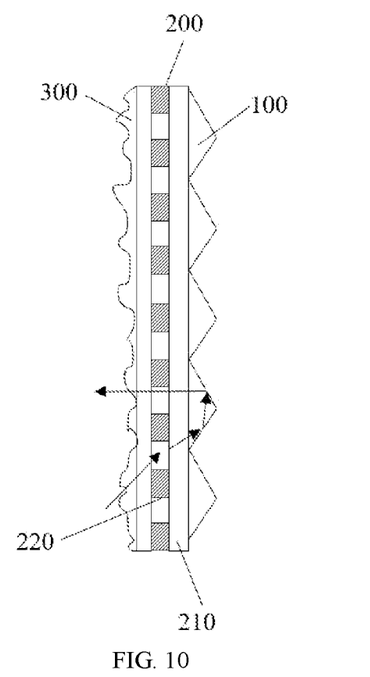
FIG. 10 is a schematic diagram of an optical collimation layer according to a ninth embodiment of the present disclosure.

FIG. 10 is a schematic diagram of an optical collimation layer according to a ninth embodiment of the present disclosure. As shown in FIG. 10, the optical collimation layer is an annular total internal reflection (TIR) layer, which allows two total internal reflections on the collimation microstructure, without the need to providing an additional reflective coating. The ring center of the annular TIR layer and the circle center of the concentric rings of the grating absorption layer are both located on the vertical symmetrical center line of the projection screen, and can coincide or not coincide with each other.

Tenth Embodiment

Figure 11:
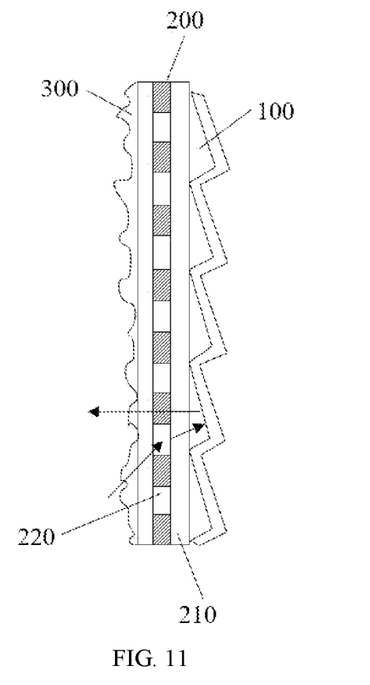
FIG. 11 is a schematic diagram of an optical collimation layer according to a tenth embodiment of the present disclosure.

FIG. 11 is a schematic diagram of an optical collimation layer according to a tenth embodiment of the present disclosure. As shown in FIG. 11, the optical collimation layer is an annular Fresnel structure layer. When the optical collimation layer is an annular Fresnel structure layer, a reflective coating is provided on a microstructure surface of the Fresnel structure, and light is totally reflected once by the collimation microstructure and then returns to the eyes of the viewer. The ring center of the annular Fresnel structure layer and the circle center of the concentric rings of the grating absorption layer are both located on the vertical symmetrical center line of the projection screen, and can coincide or not coincide with each other.

In conclusion, the present disclosure provides a projection screen. By setting gratings arranged non-uniformly in the form of concentric rings, the projection screen has characteristics of good brightness uniformity and high ambient light resistance. Meanwhile, the grating absorption structure can effectively distinguish the projection light from the ambient light, so that the projection screen has a high gain, thus reducing the cost of optical engine of the projector.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A projection screen, comprising:
   an optical collimation layer and a surface diffusion layer that are sequentially disposed; and
   a grating absorption layer configured to absorb ambient light from various directions except direction of incident projection light and disposed between the optical collimation layer and the surface diffusion layer,
   wherein the grating absorption layer comprises ring-shaped light-absorbing units with different radiuses, wherein the ring-shaped light-absorbing units are arranged in a form of concentric rings, and at least two of gratings are arranged along a circumference of one of the concentric rings to form each of the ring-shaped light-absorbing units; and with a vertical symmetrical center line of the projection screen as a center, in directions extending towards a left side and a right side of the projection screen along the circumference of one of the concentric rings, distances between two adjacent gratings of the at least two gratings in one of the ring-shaped light-absorbing units increase gradually; and
   wherein extension lines of length directions of the gratings in each of the concentric rings intersect at a circle center of the concentric rings.

2. The projection screen according to claim 1, wherein a distance between two adjacent gratings of the gratings respectively located in two of the ring-shaped light-absorbing units is increasing gradually along a direction away from a circle center of the concentric rings.

3. The projection screen according to claim 1, wherein a circle center of the concentric rings is located on the vertical symmetrical center line of the projection screen.

4. The projection screen according to claim 1, wherein each of the gratings has a cross section having a shape of a triangle, a rectangle, a trapezoid, or a semicircle.

5. The projection screen according to claim 4, wherein the grating absorption layer further comprises a transparent substrate, and the gratings are disposed on the transparent substrate.

6. The projection screen according to claim 4, wherein the gratings are disposed on a substrate of the optical collimation layer or a substrate of the surface diffusion layer.

7. The projection screen according to claim 1, wherein the gratings are made of a gray translucent material with absorptivity smaller than 90%.

8. The projection screen according to claim 1, wherein the optical collimation layer is an annular total internal reflection (TIR) layer or an annular Fresnel structure layer.

9. The projection screen according to claim 8, wherein a reflective coating is provided on surfaces of microstructures of the annular Fresnel structure layer.

10. The projection screen according to claim 8, wherein a circle center of the concentric rings of the grating absorption layer, and one of a ring center of the annular TIR layer and a ring center of the annular Fresnel structure layer, are both located on the vertical symmetrical center line of the projection screen.

11. The projection screen according to claim 1, wherein each of the gratings has a height ranging from 50 μm to 1000 μm, a width ranging from 50 μm to 500 μm, and a length ranging from 50 μm to 1665 mm; and a distance between adjacent gratings of the gratings ranges from 200 μm to 2000 μm.

* * * * *